(12) United States Patent
Chou

(10) Patent No.: US 9,545,763 B2
(45) Date of Patent: Jan. 17, 2017

(54) EMERGENCY REPAIR KIT FOR PUNCTURED TIRES

(71) Applicant: Wen-San Chou, Tainan (TW)

(72) Inventor: Wen-San Chou, Tainan (TW)

( * ) Notice: Subject to any disclaimer, the term of this patent is extended or adjusted under 35 U.S.C. 154(b) by 0 days.

(21) Appl. No.: 14/940,011

(22) Filed: Nov. 12, 2015

(65) Prior Publication Data

US 2016/0136906 A1 May 19, 2016

(30) Foreign Application Priority Data

Nov. 18, 2014 (TW) .............................. 103139969 A

(51) Int. Cl.
*B65B 31/00* (2006.01)
*B29C 73/16* (2006.01)
*B29C 73/02* (2006.01)
*B29L 30/00* (2006.01)

(52) U.S. Cl.
CPC ........... *B29C 73/166* (2013.01); *B29C 73/025* (2013.01); *B29L 2030/00* (2013.01)

(58) Field of Classification Search
CPC .... B29C 73/025; B29C 73/166; B29C 29/062; B65D 5/50; B65D 25/20
USPC .................... 141/38, 104, 105, 313; 137/223
See application file for complete search history.

(56) References Cited

U.S. PATENT DOCUMENTS

2015/0059920 A1* 3/2015 Takahara .............. B29C 73/166
141/5

* cited by examiner

*Primary Examiner* — Jason K Niesz

(57) ABSTRACT

An emergency repair kit for tire punctures is disclosed, which generally includes a sealant dispenser and a box having a large bottom surface and accommodating therein compressor unit that can supply compressed air into a bottle of the sealant dispenser via an air input connection tube of the sealant dispenser to force the chemical sealant contained in the bottle to flow out of a sealant output connection tube of the sealant dispenser for inflating and repairing a punctured tire. A basket is used to detachably couple the sealant dispenser to the box, so that the sealant dispenser can stand on a surface more firmly. Therefore, the sealant dispenser can be prevent from displacement or overturn due to vibrations, so that the emergency repair kit can be operated more safely and conveniently.

10 Claims, 15 Drawing Sheets

EMERGENCY REPAIR KIT FOR PUNCTURED TIRES

EMERGENCY REPAIR KIT FOR PUNCTURED TIRES (a) Technical Field of the Invention

The present invention relates to an emergency repair kit for punctured tires and, more particularly, to an emergency repair kit that can inflate and repair punctured tires.

(b) Description of the Prior Art

Conventionally, emergency repair kits for inflating and repairing punctured tires includes a box and a sealant dispenser, wherein the box accommodates therein a compressor unit, and the sealant dispenser contains a chemical sealant. Some repair kits employ one hose connected between the sealant dispenser and the compressor unit within the box, and employ another hose connected between the sealant dispenser and a punctured tire. In operation, vibrations may cause displacement or overturn of the sealant dispenser. For some repair kits, in use, the sealant dispenser is placed on top of the box which contains the compressor unit. They are also subjected to the problem of stability.

In view of the foregoing, the applicant intends to develop an emergency repair kit that allows a sealant dispenser thereof to stand on a surface more firmly, so that a punctured tire can be inflated and repaired more safely and effectively.

SUMMARY OF THE INVENTION

One object of the present invention is to provide an emergency repair kit for punctured tires, which comprises a box and a sealant dispenser, wherein the box accommodates therein a compressor unit, and the sealant dispenser contain a chemical sealant. The dispenser can be detachably coupled to the box by a basket, so that the sealant dispenser can stand on a surface more firmly and thus prevent displacement or overturn due to vibrations, thereby increasing the stability and safety of the sealant dispenser and facilitating operation of the emergency repair kit.

According to one feature of the present invention, when the sealant dispenser is not in use, a sealant hose with a hose adapter can be stored in the basket, and the hose adapter is capable of being threadedly sealed by a rotary handle so that, in case the switch provided on the box is unintentionally turned on, the chemical sealant contained in the sealant dispenser can be prevent from flowing out of the hose adapter of the sealant hose; when the sealant dispenser is required for a punctured tire, the sealant hose can be taken out of the basket, and the rotary handle can be threadedly removed from the hose adapter of the sealant hose and then mounted to the sealant dispenser.

According to another feature of the present invention, the sealant dispenser generally includes a bottle and a cap mounted over a top opening of the bottle, wherein the cap is provided with a protrusion for engaging with a hole of the basket, so that the basket is connected to the sealant dispenser.

According to a further feature of the present invention, in operation, the rotary handle can be turned by a user to have an elongated rod push a control valve provided in the bottle, so that compressed air supplied from the compressor unit can flow into the bottle to force the chemical sealant to flow out of the bottle.

According to a still further feature of the present invention, the cap is provided with a short post, wherein two adjacent sides of a cross section of the short post are formed into a right-angled part. The rotary handle defines a track along the cylindrical shell thereof. The track extends from an entrance opening, which is defined at a bottom of the cylindrical shell of the rotary handle, to a terminal end at a higher position. The cylindrical shell of the rotary handle is provided with an engagement pin close to the terminal end of the track. When the rotary handle is rotated to its ultimate position, the engagement pin can engage with the right-angled part of the short post, so that the rotary handle can be fixed at the ultimate position.

Other objects, advantages, and novel features of the present invention will become more apparent from the following detailed description when taken in conjunction with the accompanying drawings.

DETAILED DESCRIPTION OF THE PREFERRED EMBODIMENTS

Figure 1:
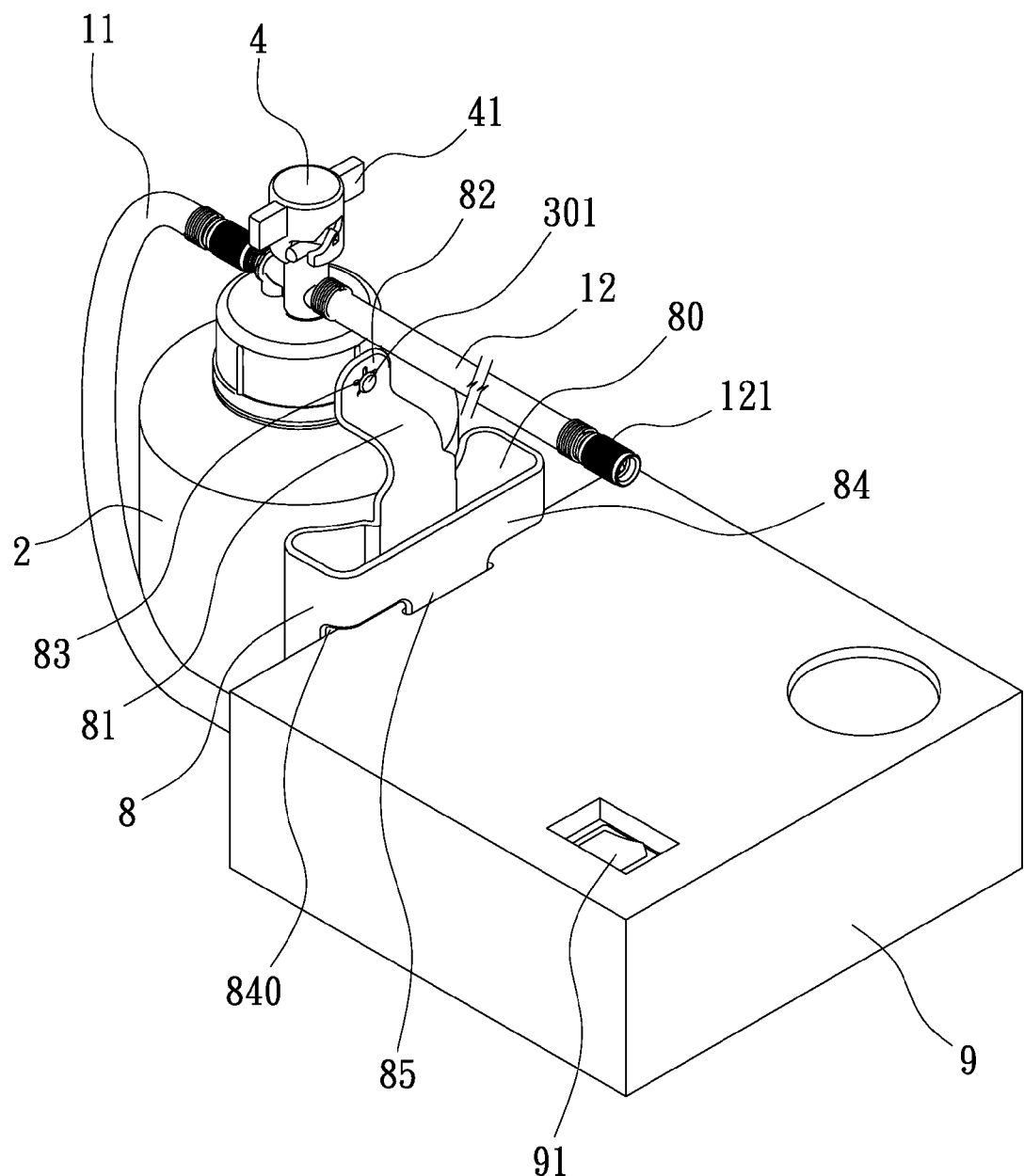
FIG. 1 shows a 3-dimensional view of an emergency repair kit for punctured tires according to one embodiment of the present invention.
Figure 2:
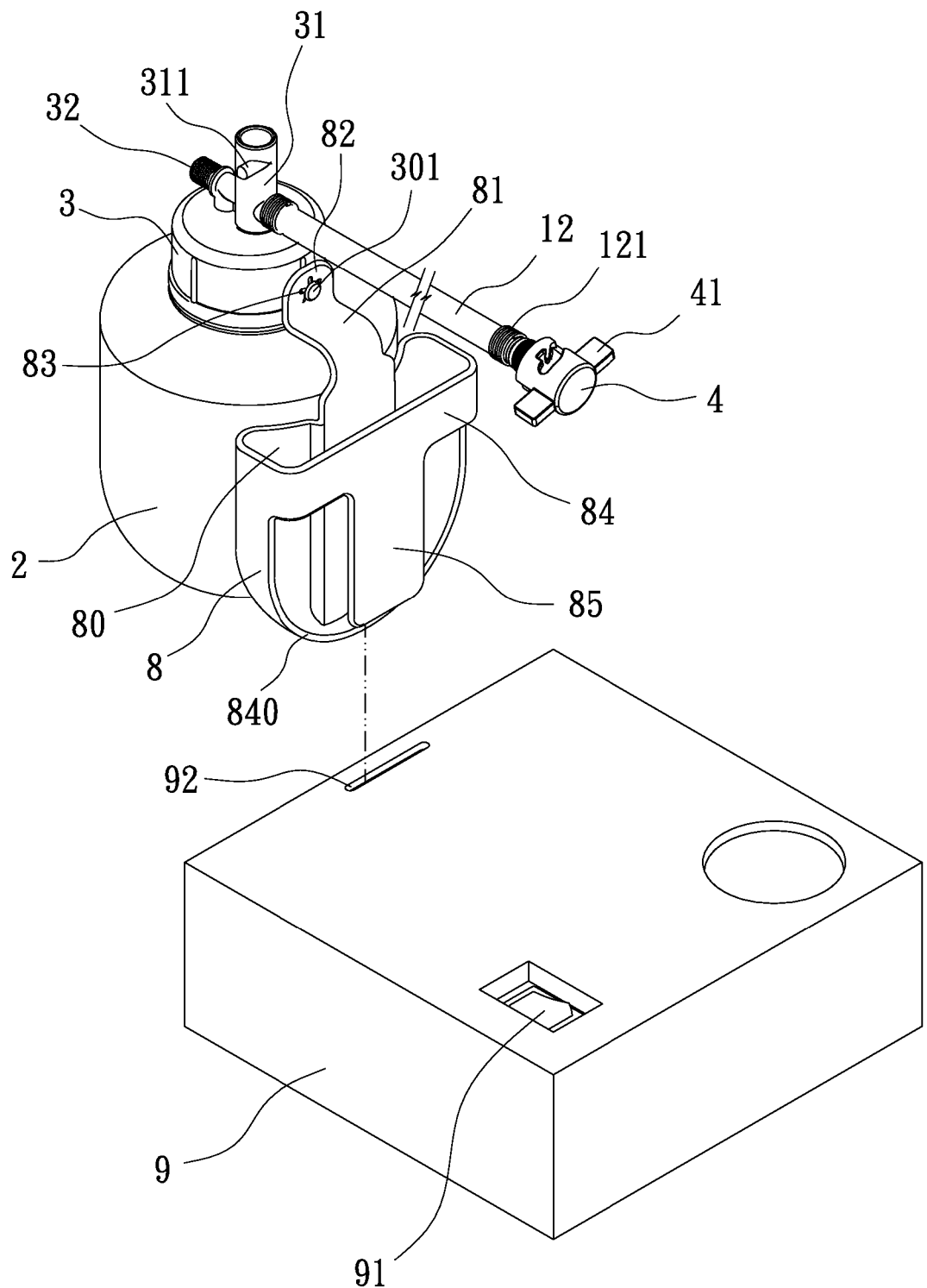
FIG. 2 shows an exploded view of the emergency repair kit.
Figure 3:
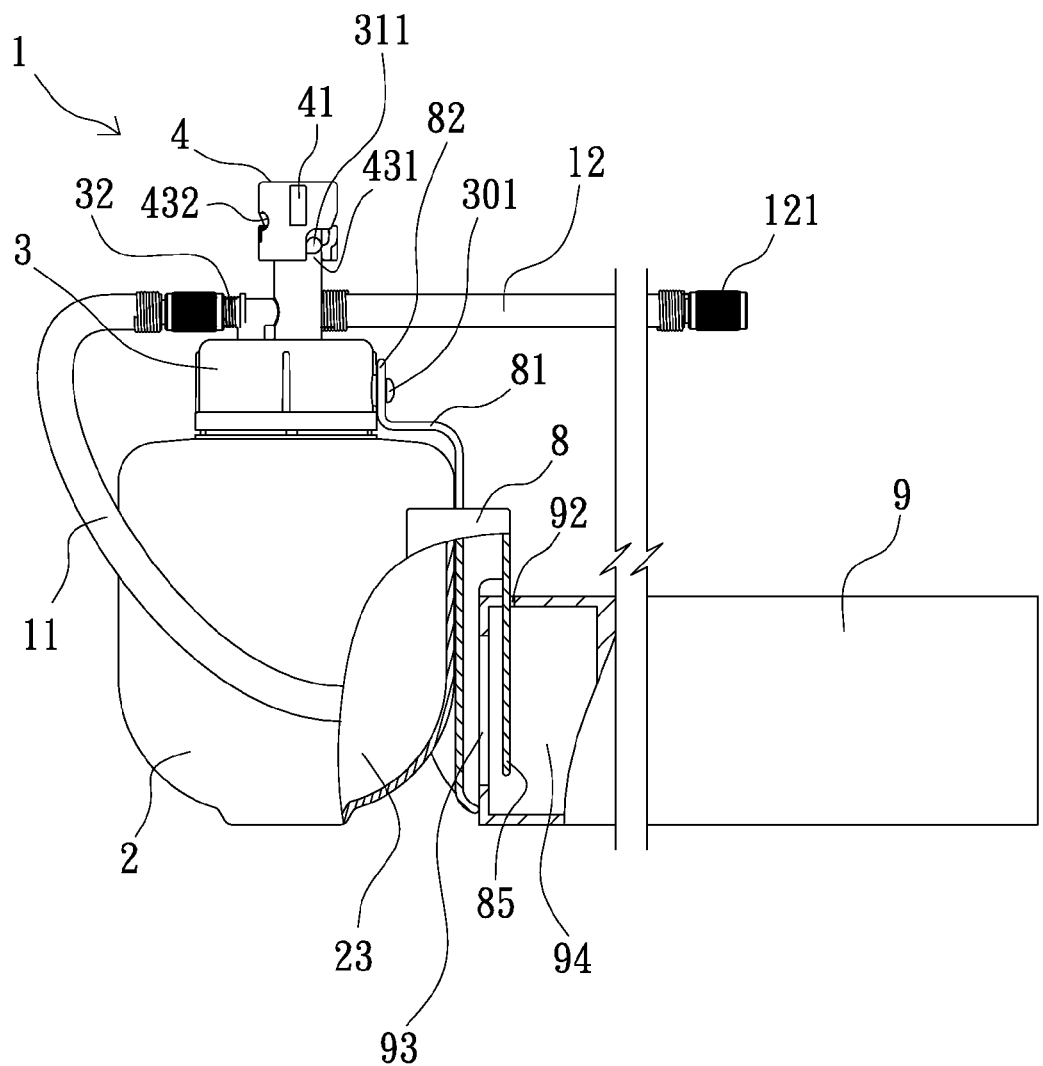
FIG. 3 shows a sectional view of the emergency repair kit.

Referring to FIGS. 1, 2 and 3, an emergency repair kit for punctured tires according to one embodiment of the present invention is shown, which generally comprises a box 9, a basket 8, and a sealant dispenser 1. The box 9, preferably with a large bottom surface, is provided with a rocker-type switch 91 and defines a slit 92 at its top surface. A compressor unit (not shown) is installed in the box 9. Furthermore, the box 9 defines an opening 93 at one side thereof, which extends into the interior of the box 9 to define a storage space 94 for storing an air hose 11 that can be connected between the sealant dispenser 1 and the compressor unit within the box 9. When an inflating and repairing operation is required, the air hose 11 can be taken out of the opening 93 to be connected to an air input connection tube 32 of the sealant dispenser 1. A sealant hose 12 is connected to a sealant output connection tube 34 of the sealant dispenser 1 at one end thereof, wherein the other end of the sealant hose 12 is provided with a nozzle adapter 121 which can be connected with an air nozzle of a punctured tire. When the switch 91 is turned on, compressed air produced in the compressor unit within the box 9 can flow into the interior of the sealant dispenser 1, and then flow into the punctured tire via the sealant hose 12 to inflate and repair the tire.

Figure 4:
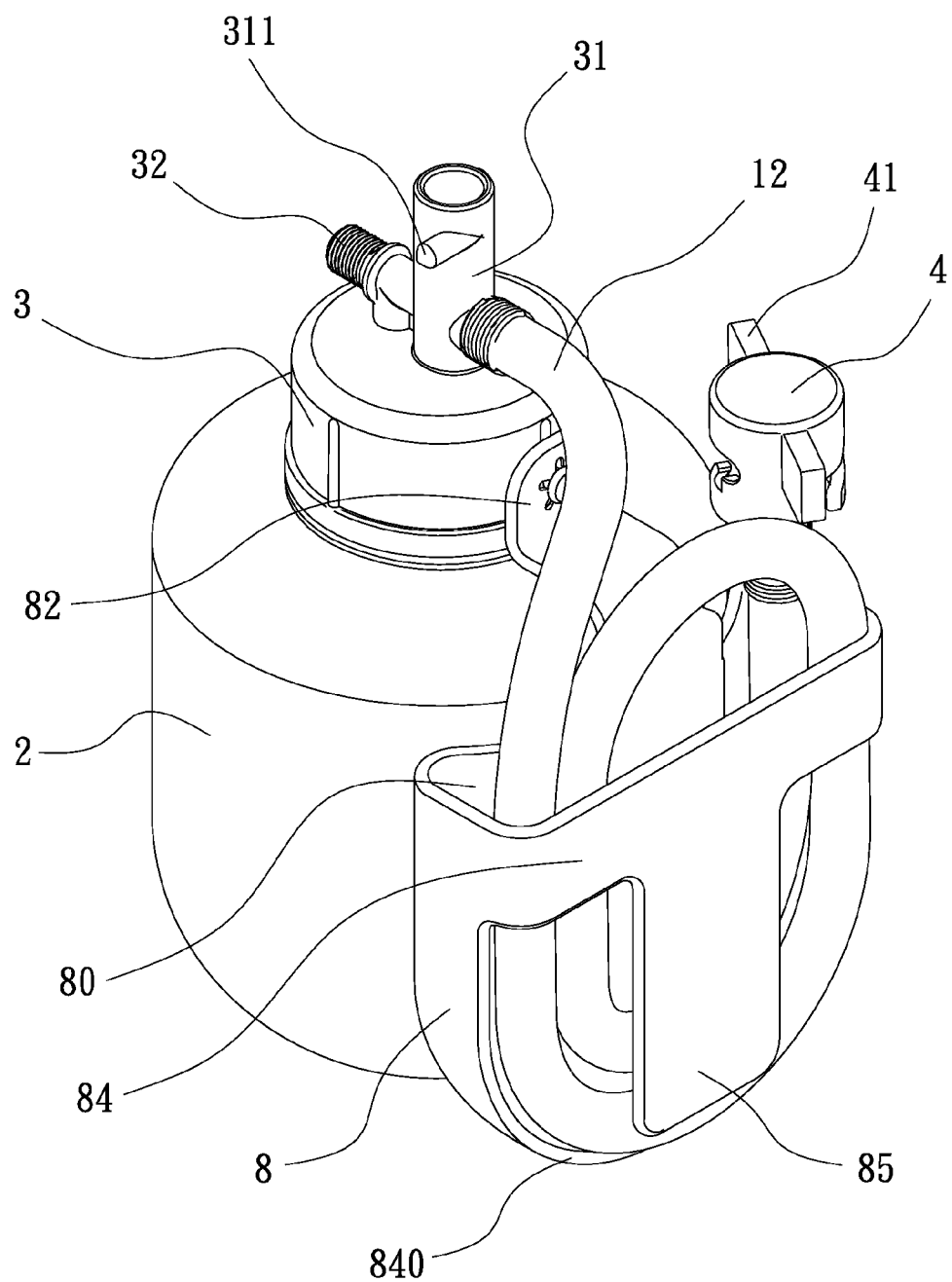
FIG. 4 shows a 3-dimensional view of a basket being connected to a sealant dispenser of the emergency repair kit.
Figure 6:
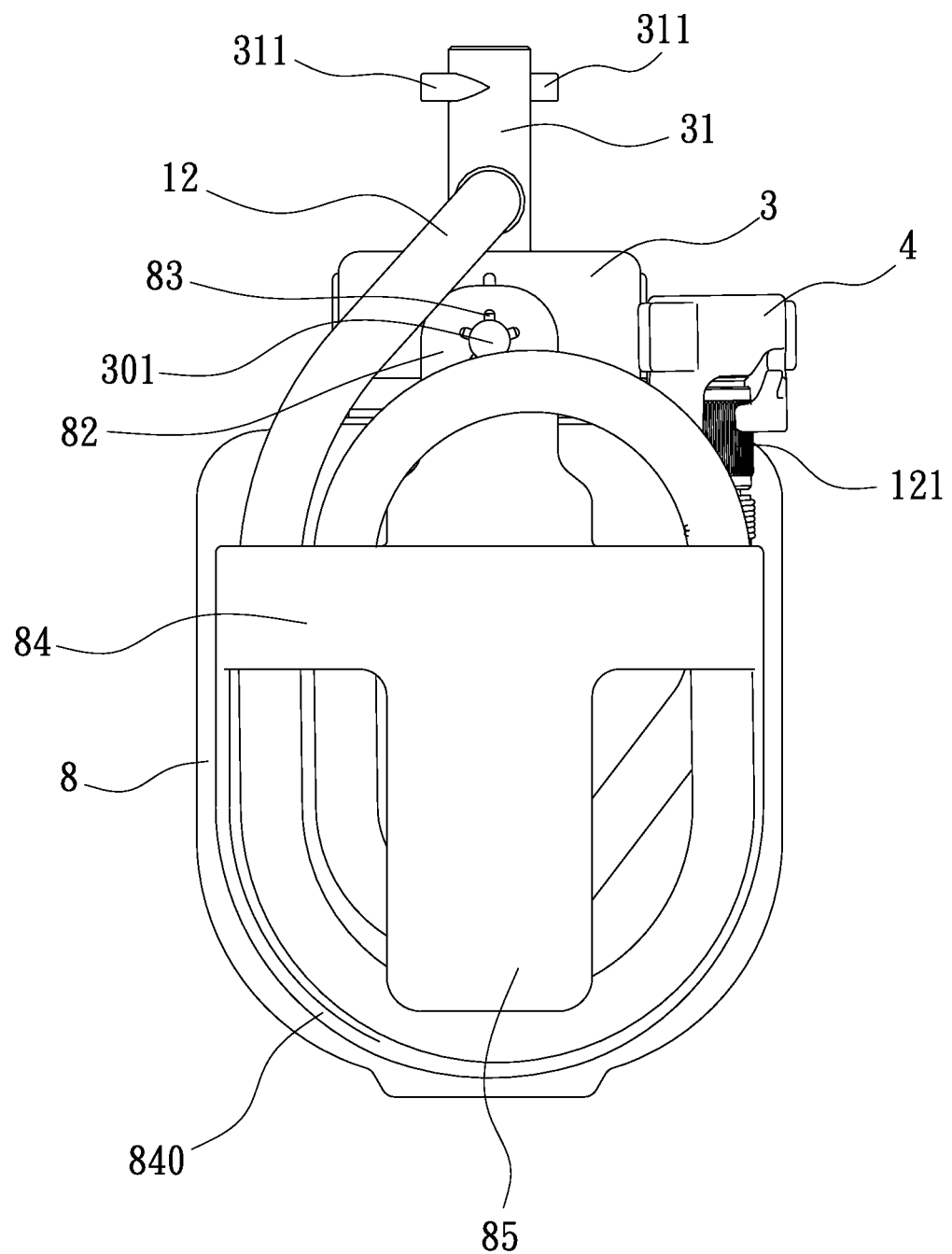
FIG. 6 shows a plan view of the basket being connected to the sealant dispenser of the emergency repair kit.

The basket 8, which can be used to detachably couple the sealant dispenser 1 to the box 9, defines a receiving space 80 for storing the sealant hose 12 (see FIGS. 4 and 6). The basket 8 has a curved strap 81 extending upwardly from one side thereof, which conforms to the sealant dispenser 1 and terminates at a tab 82 defining a non-circular hole 83. The basket 8 has an upper horizontal strap 84 at an opposite side with an open bottom 840. Also, the basket 8 has an engagement strap 85 extending downwardly from the upper horizontal strap 84 and capable of being inserted through the slit 92 of the box 9, as shown in FIGS. 2 and 3, so that basket 8 can be connected to the box 9 at one side thereof.

Figure 5:
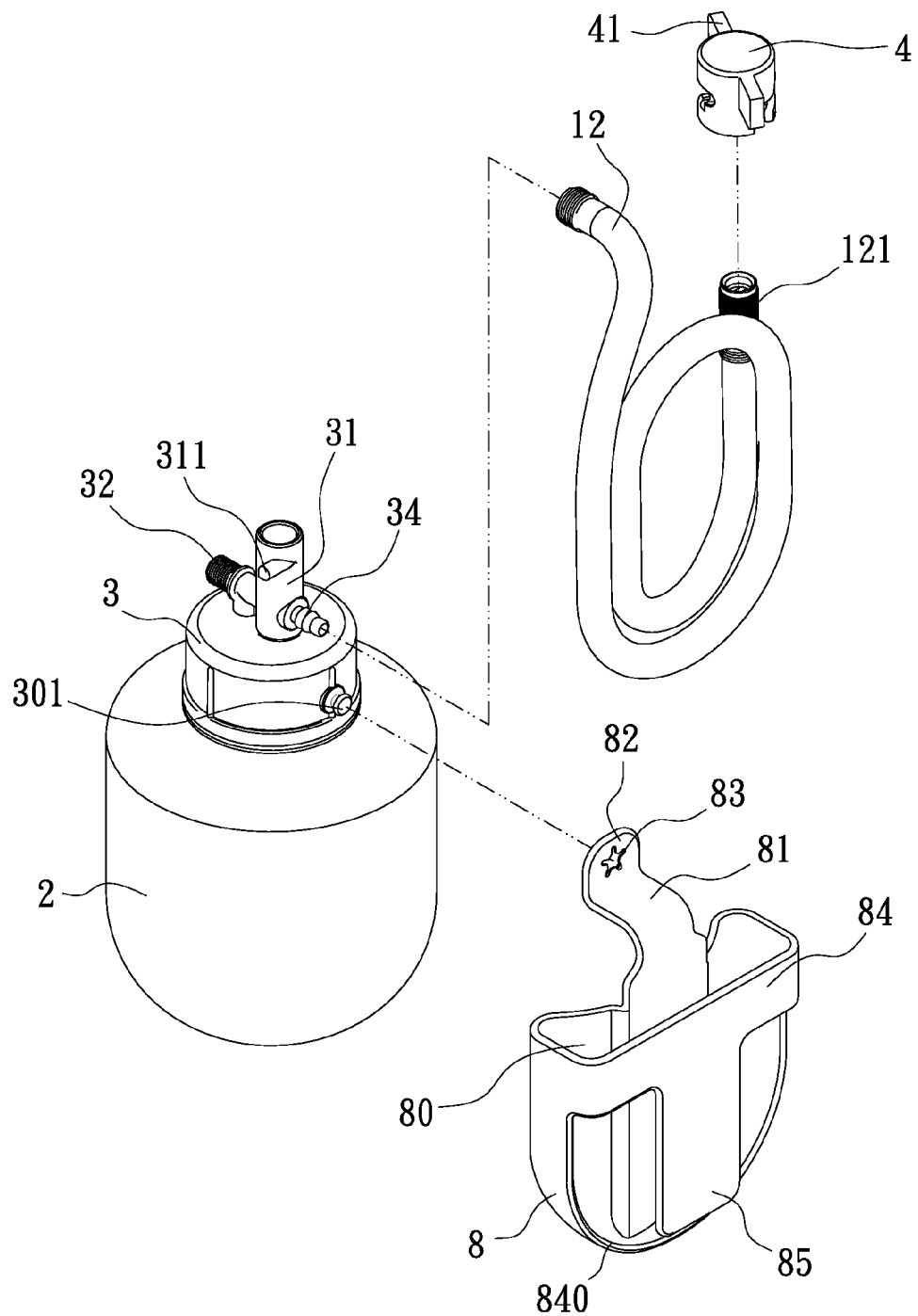
FIG. 5 shows an exploded view of the sealant dispenser, the basket, and a sealant hose of the emergency repair kit.

Referring to FIGS. 4 and 5, the sealant dispenser 1 generally includes a bottle 2 and a cap 3, wherein the cap 3 is provided with a protrusion 301. The basket 8 can be connected to the sealant dispenser 1 by engaging the protrusion 301 with the hole 83 of the basket 8, so that the basket 8 is connected to the sealant dispenser 1 at the other side thereof. With the basket 8 connected between the box 9 and the sealant dispenser 1, the sealant dispenser 1 can be stand on a surface more firmly to prevent displacement or overturn due to vibrations.

Figure 9:
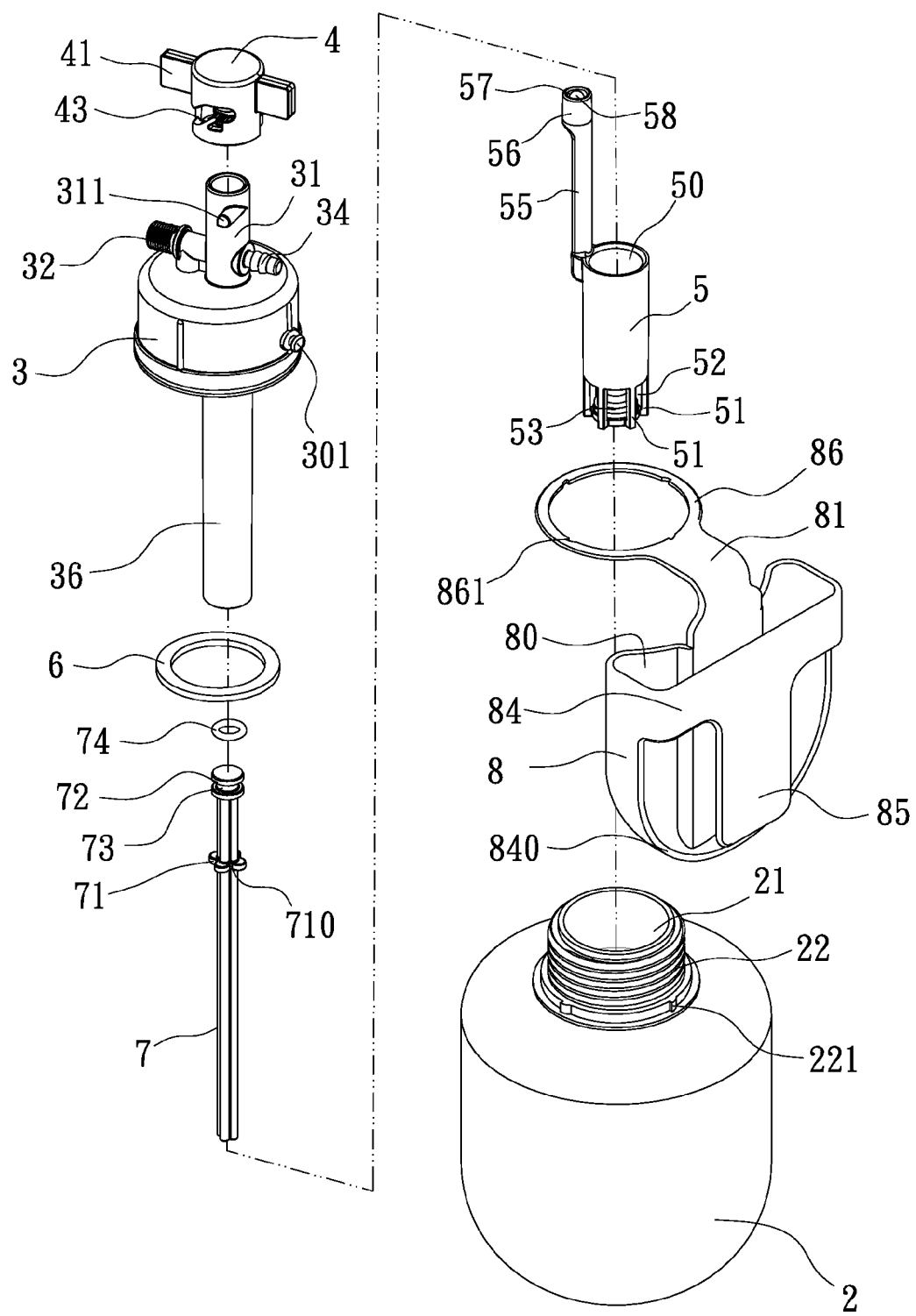
FIG. 9 shows another exploded view of the sealant dispenser and the second embodiment of the basket of the emergency repair kit.
Figure 10:
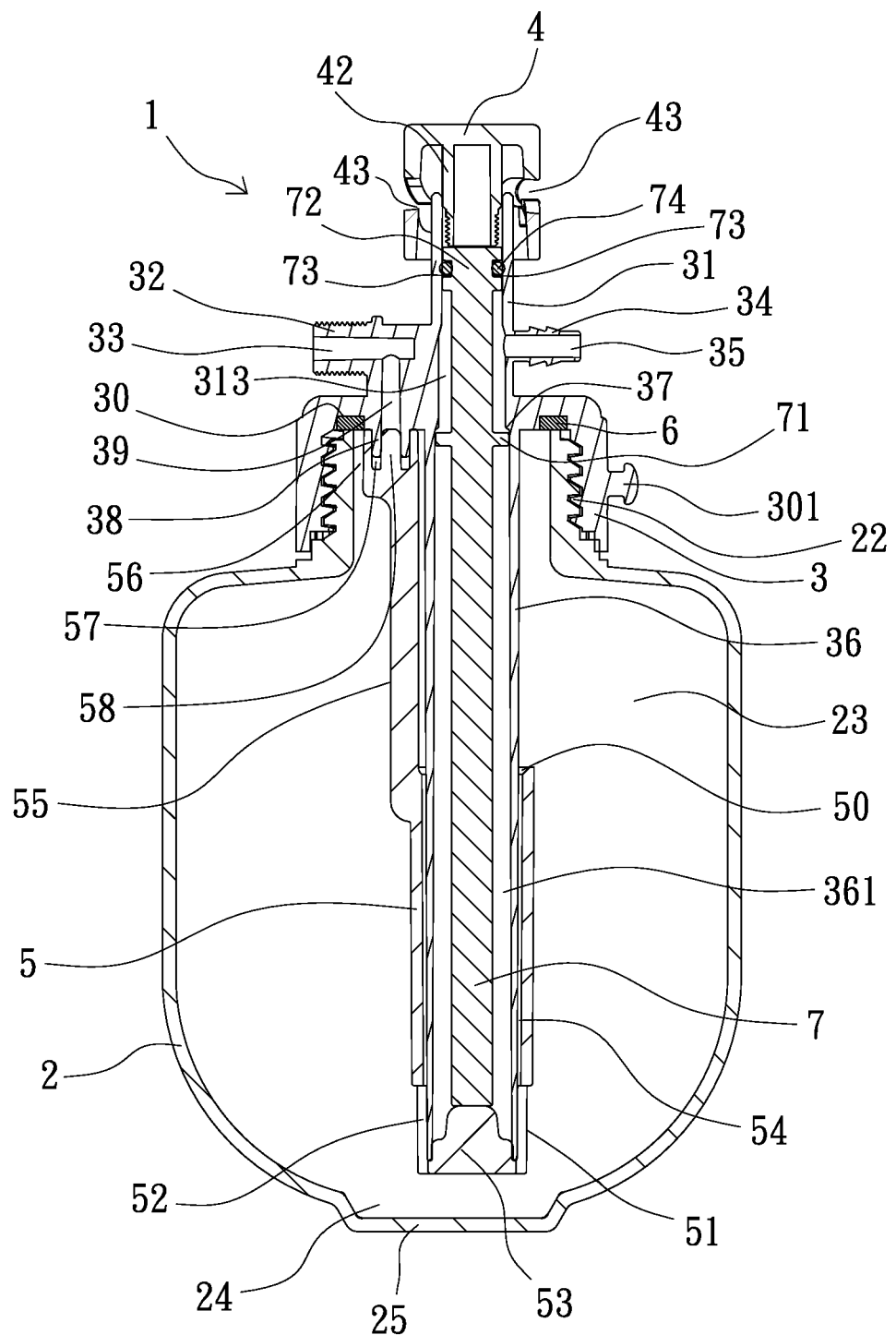
FIG. 10 shows a sectional view of the sealant dispenser of the emergency repair kit.

Referring to FIGS. 9 and 10, the bottle 2 defines therein an inner space 23. The bottle 2 has a neck portion, which defines a top opening 21, and a flat bottom 25 opposite to the top opening 21. The neck portion of the bottle 1 is provided with external threads 22. A recessed space 24 is defined above the flat bottom 25. A chemical sealant 26, which can repair punctured tires, is stored in the inner space 23 of the bottle 2.

Figure 11:
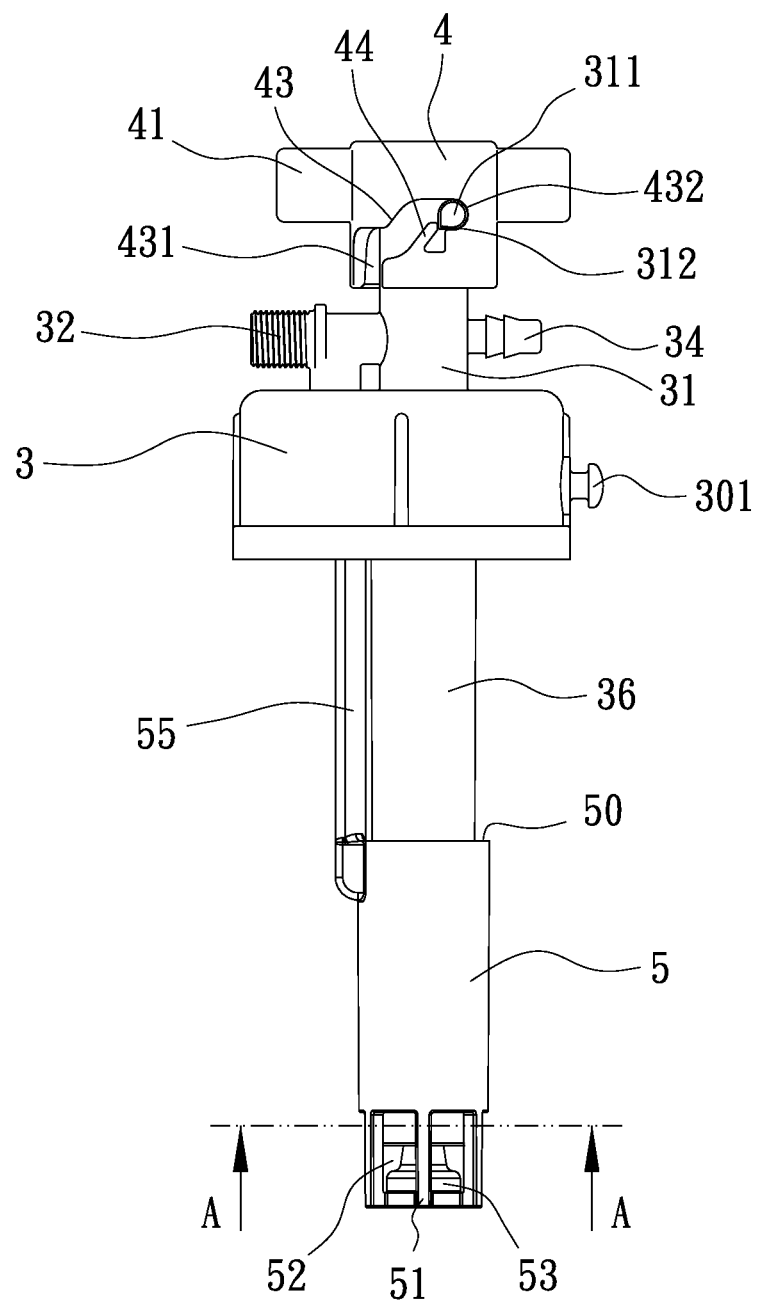
FIG. 11 shows a plan view of an assembled structure consisting of a cap, a control valve, and a rotary handle used in the sealant dispenser.

The cap 3 is threadedly mounted to the neck portion of the bottle 2 which defines the top opening 21. The cap 3 defines at its inner surface an annular groove 30 to be fitted with a gasket 6, which allows the cap 3 to seal the top opening 21 of the bottle 2 more properly. An upper pipe 31, which is integrally formed with the cap 3, extends upwardly from the top of the cap 3. A lower pipe 36, which is integrally formed with the cap 3, extends downwardly from the inner surface of the cap 3. The upper pipe 31 defines an inner passage 313 while the lower pipe 36 defines an inner passage 361. The inner passage 313 of the upper pipe 31 communicates with the inner passage 361 of the lower pipe 36. A horizontal short post 311 is provided at the upper pipe 31. The short post 311 has a non-circular cross section, two sides of which are formed into a right-angled part 312 (see FIG. 11). Furthermore, the upper pipe 31 is provided with the air input connection tube 32 and the sealant output connection tube 34. The air input connection tube 32 defines an air passage 33. The inner surface of the cap 3 is provided with a short tube 38, which communicates with an intermediate channel 39 defined in the cap 3. The air passage 33 can communicate with the inner space 23 of the bottle 2 via the intermediate channel 39 that communicates with the short tube 38. The sealant output connection tube 34 defines a sealant passage 35, which communicates with the inner passage 313 of the upper tube 31. The inner passage 313 of the upper pipe 31 has a diameter less than the inner passage 361 of the lower pipe 36 such that an inner conical surface 37 is formed between the inner passage 313 of the upper pipe 31 and the inner passage 361 of the lower pipe 36.

A non-circular elongated rod 7 has an enlarged top end 72, which defines an annular groove 73 to be fitted with an O-ring 74. Furthermore, the elongated rod 7 is provided below the top end 72 with a projection 71 defining multiple concavities 710. The elongated rod 7 can be fitted in the inner passages 313, 361 through the lower end of the lower pipe 36, wherein the inner conical surface 37 can facilitate the top end 72 of the elongated rod 7 with the O-ring 74 to be inserted into the inner passage 313 of the upper pipe 31; furthermore, due to the projection 71 of the elongated rod 7 being blocked by the conical surface 37, the elongated rod 7 can be prevent from sliding out of the inner passage 313 of the upper pipe 31.

The control valve 5 has a tube and a stem 55. The tube of the control valve 5 defines therein a central bore 54 which opens out at a top opening 50 thereof. Furthermore, the tube of the control valve 5 is provided at its bottom with multiple strips 51 and defines multiple gaps 52 between the strips 51. An inner stepped plug 53 is attached to lower ends of the strips 51 and surrounded by the multiple gaps 52. The stem 55 extends upwardly from the end of the tube which defines the top opening 50. A distal end of the stem 55 is formed into an upper plug 56 which has a central pin 58 and defines an annular cavity 57 around the central pin 58. The lower pipe 36 can be inserted into the central bore 54 of the tube of the control valve 5 via the top opening 50 such that a lower end of the lower pipe 36 is snugly fitted over the inner stepped plug 53 and thus closes the inner passage 361 of the lower pipe 36, and a lower end of the elongated rod 7 is in contact with the stepped plug 53. The central pin 58 of the upper plug 56 can be inserted into the short tube 38 to block the intermediate channel 39 that communicates with the air passage 33 of the air input connection tube 32. At the same time, the annular cavity 57 can be snugly fitted around the short tube 38.

A cap-shaped rotary handle 4 can be mounted over the upper pipe 31 to touch the elongated rod 7. The rotary handle 4 has a cylindrical shell with a closed top, two opposite blades 41 provided at the cylindrical shell, and a central post 42 extending downwardly from an inner surface of the closed top and capable of touching the top end 72 of the elongated rod 7. The rotary handle 4 defines a track 43 along the cylindrical shell thereof, wherein the track 43 extends from an entrance opening 431, which is defined at a bottom of the cylindrical shell of the rotary handle 4, to a terminal end 432 at a higher position. Furthermore, the cylindrical shell of the rotary handle 4 is provided, close to the terminal end 432 of the track 43, with an engagement pin 44 for engaging with the right-angled part 312 of the short post 311. When the sealant dispenser 1 is not use, the rotary handle 4 can be threadedly fitted to the nozzle adapter 121 of the sealant hose 12 to prevent it from falling off the upper pipe 31 when taking the sealant dispenser 1.

When the sealant dispenser 1 is not in use, the sealant hose 12 can be stored in the basket 8, and the nozzle adapter 121 of the sealant hose 12 can be threadedly sealed by the rotary handle 4 so that, in case the switch 91 is unintentionally turned on, the chemical sealant 26 can be prevent from flowing out of the nozzle adapter 121 of the sealant hose 12.

Figure 12:
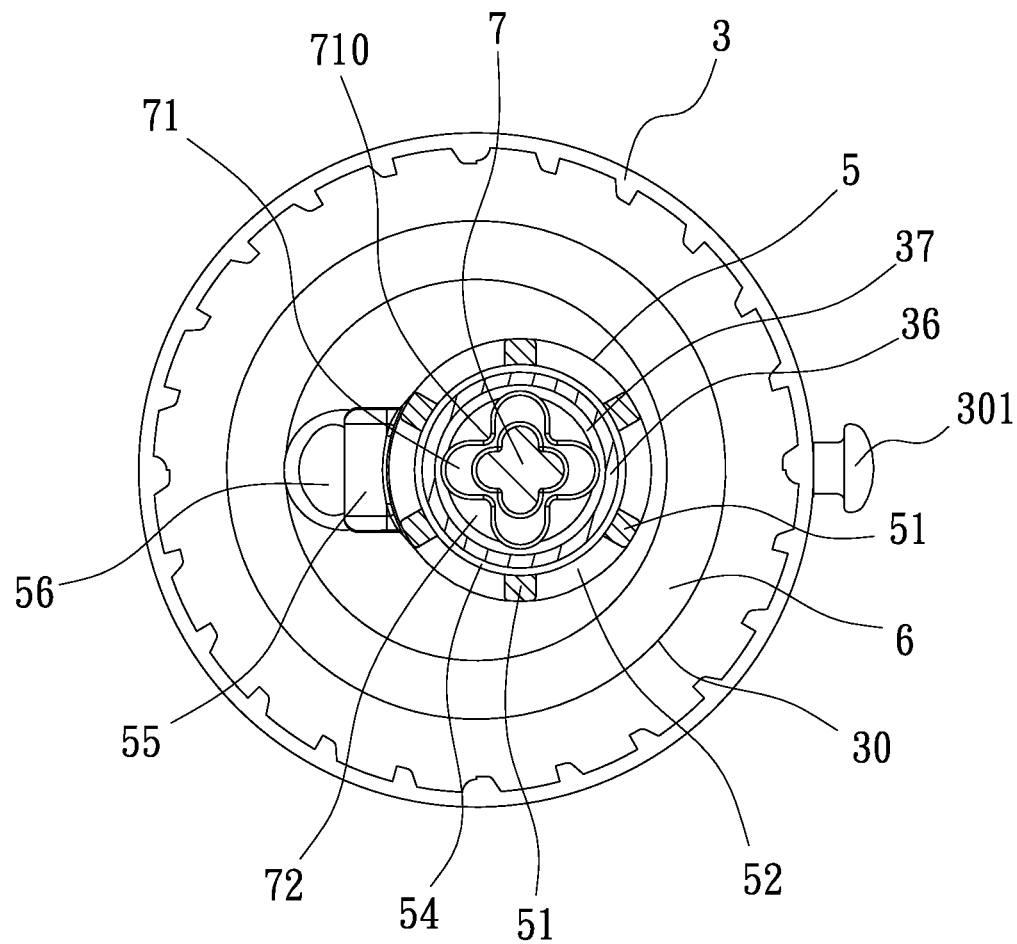
FIG. 12 shows a sectional view of the assembled structure taken along line A-A in FIG. 11.
Figure 13:
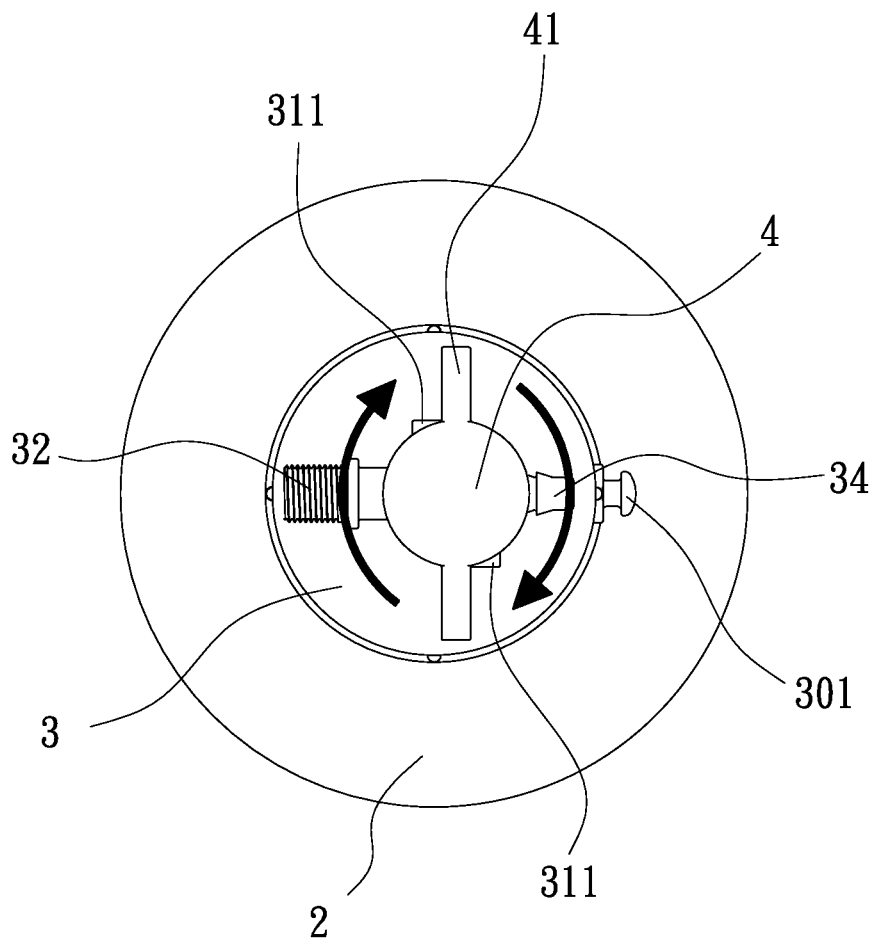
FIG. 13 shows a schematic view of the sealant dispenser, wherein the rotary handle is being rotated for operating the sealant dispenser.
Figure 14:
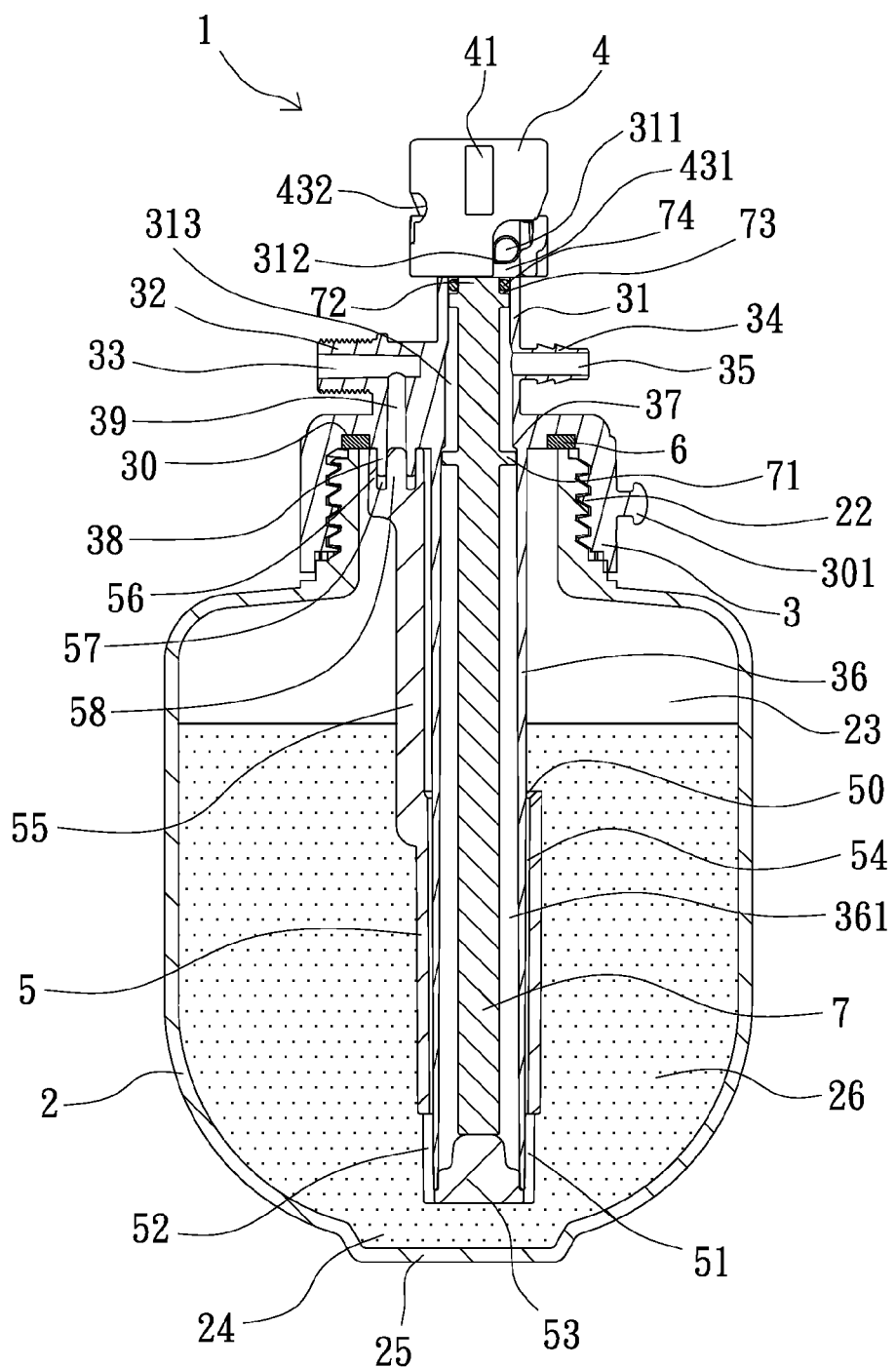
FIG. 14 shows a schematic view of the sealant dispenser, which is at its initial state.
Figure 15:
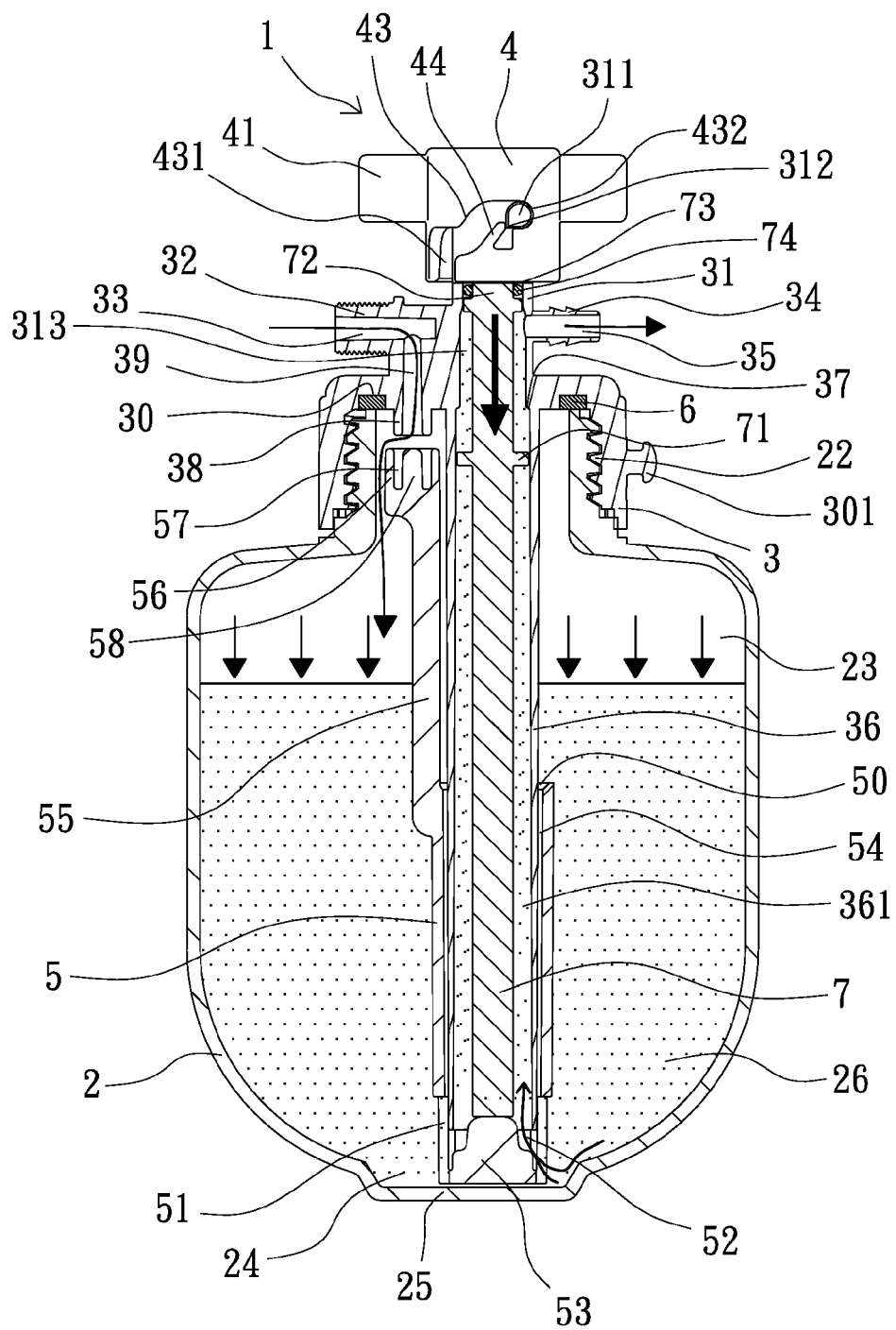
FIG. 15 shows a schematic view of the sealant dispenser, which demonstrates the air flow and the sealant flow after the rotary handle has been rotated to its ultimate position.

FIG. 14 shows a initial state of the sealant dispenser 1, wherein the intermediate channel 39 is blocked by the upper plug 56 of the control valve 5, the lower pipe 36 is blocked by the inner stepped plug 53 of the control valve 5, and the elongated rod 7 is in contact with the inner stepped plug 53. As shown, the intermediate channel 39 does not communicate with the inner space 23 of the bottle 2, and the inner passages 313, 361 of the upper and lower pipes 31, 36 do not communicate with the inner space 23 of the bottle 2. In operation, the rotary handle 4 can be threadedly removed from the hose adapter 121 of the sealant hose 12 to mount over the upper pipe 13, wherein the short post 311 can be aligned with the entrance opening 431 of the track 43 to have the rotary handle 4 mounted over the upper pipe 31 of cap 3. Next, the rotary handle 4 can be rotated (see FIG. 13), to allow the short post 311 to move relative to the rotary handle 4, along the track 43, to reach the terminal end 432, at which the engagement pin 44 can engage with the right-angled part 312 of the short post 311 provided at the upper pipe 31, so that the short post 311 can be retained at the terminal end 432 of the track 43 (see FIG. 15) and thus the rotary handle 4 can be fixed at the rotated position. Since the short post 311 is stationary, during the relative movement, the rotary handle 4 is moved downwardly. Furthermore, due to the central post 42 of the rotary handle 4 being located to touch the top end 72 of the elongated rod 7, the downward movement of the rotary handle 4 will cause the elongated rod 7 to move downwardly. Thus, the inner stepped plug 53, which is in contact with the lower end of the elongated rod 7, can be forced by the central post 42 of the rotary handle 4 to have the control valve 5 moved downwardly, so that the upper plug 56 of the control valve 5 can be removed from the short tube 38 of the cap 3, and the inner stepped plug 53 can be removed from the lower pipe 36. Consequently, the intermediate channel 39 and the inner passages 313, 361 of the upper and lower pipes 31, 36 can communicate with the inner space 23 of the bottle 2, so that the compressed air can flow into the inner space 23 of the bottle 2 via the air passage 33 of the air input connection tube 32 and the intermediate channel 39 to act upon the surface of the chemical sealant 26, so that the chemical sealant 26 can be forced by the compressed air to flow into the inner passage 361 of the lower pipe 36 via the gaps 52 of the control valve 5 (see FIG. 15), and then can flow through the concavities 710 of the projection 71 of the elongated rod 7 to enter the inner passage 313 of the upper pipe 31 (see also FIG. 12). Finally, the chemical sealant 26 can flow out of the sealant passage 35 to enter a punctured tire by way of a hose connected between the sealant output connection tube 34 and the air nozzle of the punctured tire. In particular, after the sealant dispenser has been used for a period of time, although the amount of the chemical sealant 26 contained in the bottle 2 is reduced, the recessed space 24 above the flat bottom 25 of the bottle 2 can facilitate collecting the remaining sealant in the bottom of the bottle 2, so that the remaining sealant can be effectively used by the control valve 5 without leftover.

Figure 7:
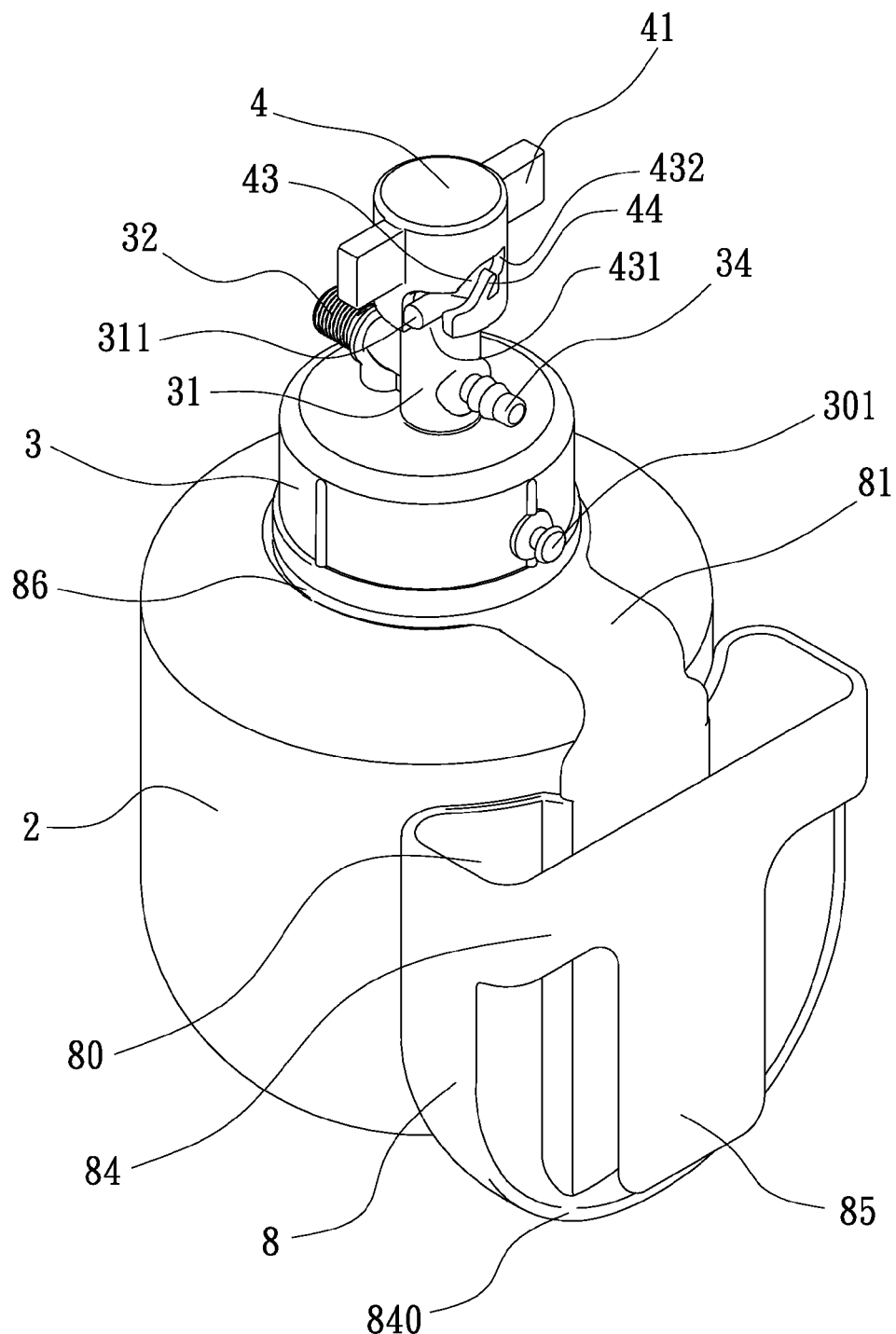
FIG. 7 shows a 3-dimensional view of a second embodiment of the basket being connected to the basket of the emergency repair kit.
Figure 8:
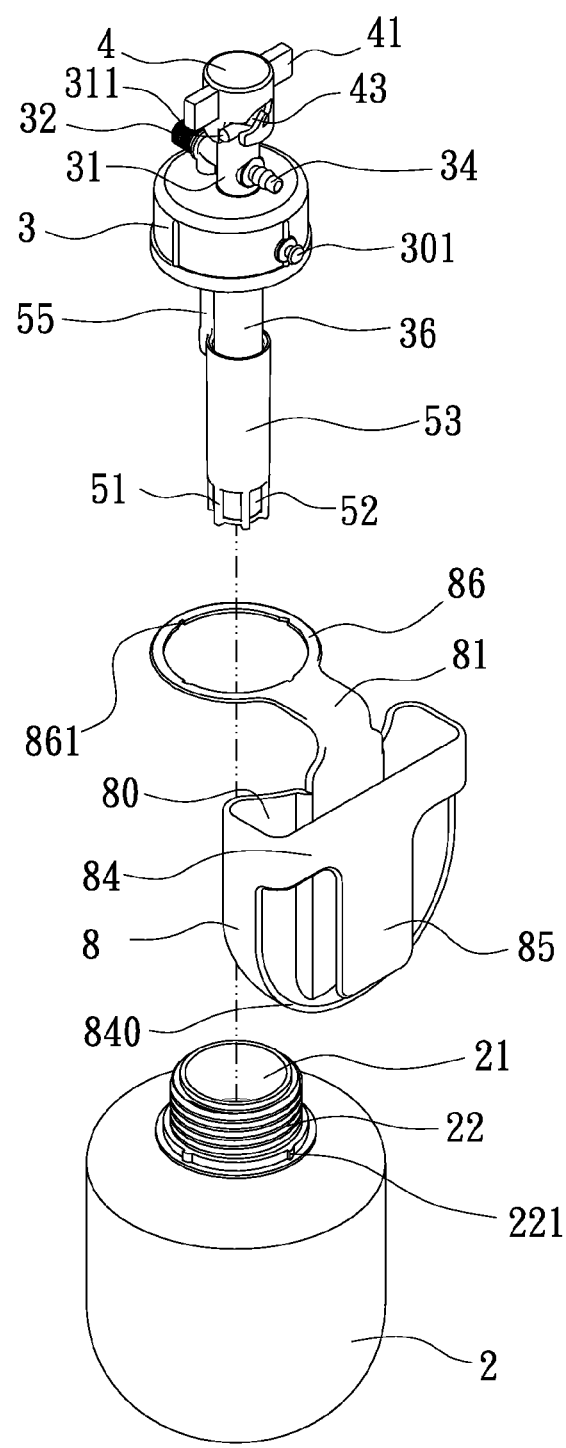
FIG. 8 shows an exploded view of the sealant dispenser and the second embodiment of the basket of the emergency repair kit.

FIGS. 7 and 8 show a second embodiment of the basket 8 of the present invention, wherein the tab 82 provided in the previous embodiment of the basket 8 (see FIG. 5) is replaced by a horizontal loop 86. Specifically, the curved strap 81 of the basket 8 is formed with the horizontal loop 86 which defines a plurality of indentations 861 along its inner edge. On the other hand, the bottle 8 is provided at a bottom of the neck portion with a plurality of protrusions 221 corresponding to the indentations 861. The basket 8 is assembled to the bottle 2 before installation of the elongated rod 7 and the control valve 5 (see also FIG. 9). The loop 86 can be fitted around the neck portion of the bottle 2, wherein the protrusions 221 of the bottle 2 can be respectively engaged with the indentations 861 of the loop 86, so that the second embodiment of the basket 8 is connected to the bottle 8.

In conclusion, the emergency repair kit of the present invention, which includes the box 9, the basket 8, and the sealant dispenser 1. The air input connection tube 32 of the sealant dispenser 1 can be connected with the compressor unit within the box 9 via the air hose 11 for transferring compressed air. The sealant dispenser 1 is detachably coupled to the box 9 by the basket 8, so that the sealant dispenser 1 can stand on a surface more firmly. In operation, when the compressor unit is started, compressed air produced in the compressor unit can flow into the sealant dispenser 1 via the air hose 11 to force the chemical sealant 26 contained in the sealant dispenser 1 to flow out of the sealant output connection tube 34, and finally flow into the a punctured tire via the sealant hose 12 for inflating and repairing the tire.

I claim:

1. An emergency repair kit for punctured tires which includes a box accommodating therein a compressor unit, and a sealant dispenser provided with an air input connection tube defining an air passage for receiving compressed air supplied from the compressed unit, and provided with a sealant output connection tube defining a sealant passage for delivering a chemical sealant contained in the sealant dispenser to a punctured tire, wherein the improvement comprises: the dispenser is detachably coupled to the box by a basket, so that the sealant dispenser can stand on a surface more firmly and thus prevent displacement or overturn due to vibrations, thereby increasing the stability and safety of the sealant dispenser and facilitating operation of the emergency repair kit, wherein the box is provided with a switch and defines a slit at its top surface and defines an opening at one side thereof, which extends into the interior of the box for storing an air hose that can be connected between the air input connection tube and the compressor unit within the box when an inflating and repairing operation is required; a sealant hose with a nozzle adapter is connected to the sealant output connection tube; the basket defines a receiving space for storing the sealant hose, the basket having a curved strap extending upwardly from one side thereof, an upper horizontal strap at an opposite side with an open bottom, and an engagement strap extending downwardly from the upper horizontal trap and capable of being inserted through the slit of the box.

2. The emergency repair kit of claim 1, wherein the curved strap terminates at a tab which defines a non-circular hole.

3. The emergency repair kit of claim 1, wherein the sealant dispenser includes a bottle, a cap, a control valve, and a rotary handle; wherein the bottle is filled with the chemical sealant and defines a top opening; the cap is mounted over the top opening of the bottle; a control valve is mounted in the bottle for controlling the air passage and the sealant passage, wherein the air passage and the sealant passage are closed by the control valve when the sealant dispenser is not in use; the rotary handle is detachably mounted on the bottle for actuating the control valve to open the air passage and the sealant passage, so that the compressed air can flow into the bottle to deliver the chemical sealant to the punctured tire via the sealant passage; when the sealant dispenser is not in use, the sealant hose can be stored in the basket, and the hose adapter of the sealant hose is capable of being threadedly sealed by the rotary handle so that, in case the switch is unintentionally turned on, the chemical sealant can be prevent from flowing out of the hose adapter of the sealant hose.

4. The emergency repair kit of claim 3, wherein the bottle has a flat bottom and defines therein an inner space which opens out at the top opening, the chemical sealant being contained in the inner space of the bottle; the cap is integrally formed with an upper pipe thereon and a lower pipe thereunder, the upper and lower pipes respectively defining inner passages communicating with each other, the upper pipe being provided with the air input connection tube defining the air passage and provided with the sealant output connection tube defining the sealant passage, the cap being threadedly mounted to a neck portion of the bottle which defines the top opening; a non-circular elongated rod being fitted in the inner passages of the upper and lower pipes; the control valve has a tube defining therein a central bore which opens out at a top opening thereof, the tube of the control valve being provided at its bottom with an inner stepped plug opposite to the top opening thereof and defining multiple gaps at its bottom, around the inner stepped plug, the lower pipe being inserted into the central bore of the tube of the control valve via the top opening of the control valve such that a lower end of the lower pipe is snugly fitted over the inner stepped plug and thus closes the gaps of the control valve, and a lower end of the elongated rod is in contact with the inner stepped plug of the control valve; the rotary handle is detachably mounted over the upper pipe of the cap to touch the elongated rod; whereby rotation of the rotary handle allows the elongated rod to move the control valve downwardly, so that the gaps of the control valve can be opened to allow the chemical sealant to flow into the inner passage of the lower pipe and the inner passage of the upper pipe and finally enter the punctured tire through the sealant passage and the sealant hose for inflating and repairing the punctured tire.

5. The emergency repair kit of claim 4, wherein the neck portion of the bottle is provided with external threads, and a recessed space is defined above the flat bottom of the bottle; the cap is provided at its inner surface with a short tube and defines at its inner surface an annular groove to be fitted with a gasket, the cap defining therein an intermediate channel which allows the air passage to communicate with the short tube, the upper pipe being provided with a short post, wherein two adjacent sides of a cross section of the short post are formed into a right-angled part, the air passage of the air input connection tube communicating with the inner space of the bottle via the intermediate channel that communicates with the short tube, the sealant passage communicating with the inner passage of the upper pipe, the inner passage of the upper pipe having a diameter less than the inner passage of the lower pipe such that an inner conical surface is formed therebetween.

6. The emergency repair kit of claim 5, wherein the elongated rod has an enlarged top end defining an annular groove to be fitted with an O-ring, and the elongated rod is provided below the enlarged top end with a projection defining multiple concavities, the projection being blocked by the inner conical surface to prevent the elongated rod sliding out of the upper pipe, the concavities of the projection allowing the chemical sealant to flow through the projection of the elongated rod.

7. The emergency repair kit of claim 5, wherein the bottom of the tube of the control valve is formed with multiple strips, and the multiple gaps are defined between the strips, the inner stepped plug being attached to lower ends of the strips, the control valve further having a stem extending upwardly from the end of the tube which defines the top opening, a distal end of the stem being formed into an upper plug which has a central pin and defines an annular cavity around the central pin, wherein the central pin can be inserted into the short tube to block the intermediate channel that communicates with the air passage of the air input connection tube, and the annular cavity can be snugly fitted around the short tube.

8. The emergency repair kit of claim 4, wherein the rotary handle has a cylindrical shell with a closed top, two opposite blades provided at the cylindrical shell, and a central post extending downwardly from an inner surface of the closed top for touching the elongated rod, the rotary handle defining a track along the cylindrical shell thereof, the track extending from an entrance opening, which is defined at a bottom of the cylindrical shell of the rotary handle, to a terminal end at a higher position, the cylindrical shell of the rotary handle being provided with an engagement pin close to the terminal end of the track.

9. The emergency repair kit of claim 5, wherein the cap is provided with a protrusion for engaging with the hole of the basket, so that the basket (8) is connected to the sealant dispenser.

10. The emergency repair kit of claim 4, wherein the curved strap of the basket is formed with a horizontal loop which defines a plurality of indentations along its inner edge, the bottle is provided at a bottom of the neck portion thereof with a plurality of protrusions corresponding to the indentations of the horizontal loop, the loop being fitted around the neck portion of the bottle, wherein the protrusions of the bottle are respectively engaged with the indentations of the loop, so that the basket is connected to the sealant dispenser.

* * * * *